(12) United States Patent
Heier et al.

(10) Patent No.: US 6,380,137 B1
(45) Date of Patent: Apr. 30, 2002

(54) COPOLYMERS AND THEIR USE AS DRILLING AIDS

(75) Inventors: Karl Heinz Heier, Frankfurt am Main; Roman Morschhäuser, Mainz; Aranka Tardi, Neuberg; Susanne Weber, Hochheim; Gernold Botthof, Antriftttal, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/517,487

(22) Filed: Mar. 2, 2000

(30) Foreign Application Priority Data

Mar. 3, 1999 (DE) .......................................... 199 09 231

(51) Int. Cl.$^7$ ................................................. C09K 7/02
(52) U.S. Cl. ........................ 507/121; 507/123; 526/263; 526/264; 526/240; 166/295
(58) Field of Search ................................ 507/121, 123, 507/226, 229; 526/263, 264, 240; 166/295

(56) References Cited

U.S. PATENT DOCUMENTS

| | | |
|---|---|---|
| 3,284,393 A | 11/1966 | Vanderhoff et al. |
| 3,624,019 A | 11/1971 | Anderson et al. |
| 3,629,101 A | 12/1971 | Hille et al. |
| 4,048,077 A | 9/1977 | Engelhardt et al. |
| 4,309,523 A | 1/1982 | Engelhardt et al. |
| 4,471,097 A | 9/1984 | Uhl et al. |
| 4,544,722 A * | 10/1985 | Giddings et al. ........... 507/121 |
| 4,743,666 A | 5/1988 | Engelhardt et al. |
| 4,749,498 A * | 6/1988 | Lange et al. ................ 507/121 |
| 4,931,489 A | 6/1990 | Kucera et al. |
| 5,035,812 A * | 7/1991 | Aignesberger et al. ..... 507/123 |
| 5,135,909 A * | 8/1992 | Stephens et al. ............ 507/121 |
| 5,260,391 A * | 11/1993 | Stephens .................... 526/264 |
| 5,510,436 A | 4/1996 | Hille et al. |
| 6,136,950 A | 11/2000 | Vickers, Jr. et al. |
| 6,284,867 B1 | 9/2001 | Vickers, Jr. et al. |

FOREIGN PATENT DOCUMENTS

| | | |
|---|---|---|
| DE | 1 089 173 | 3/1958 |
| DE | 1 301 566 | 8/1969 |
| DE | 31 44 770 | 5/1983 |
| DE | 32 45 541 | 6/1984 |
| EP | 0 095 730 | 12/1983 |
| EP | 0 141 327 | 5/1985 |
| EP | 0 483 638 | 5/1992 |
| EP | 0 572 697 | 6/1992 |
| WO | WO 83/02449 | 7/1983 |

OTHER PUBLICATIONS

Hunter, W., et al., CIOS Black List Item 22 Miscellaneous Chemicals p1–42.
Trommsdorff, Von Ernst, et al., Zur Polymerisation des Methacrylsäuremethlesters p169–198, (1947).
Derwent Patent Family Abstract for DE 31 44 770, (1983).
Derwent Patent Family Abstract for EP 0 141 327, (1985).
J. Soc. Cosmetic Chemists 1, William Griffin, (1950) p311–326.
Chemical Abstracts—Synthetic Resins and Plastics, (1960).
Derwent Patent Family Abstract for DE 1 301 566, (1968).
Derwent Patent Family Abstract for EP 0 095 730, (1983).

* cited by examiner

Primary Examiner—Philip Tucker
(74) Attorney, Agent, or Firm—Richard P. Silverman

(57) ABSTRACT

The invention provides water-soluble copolymers without crosslinking, consisting of the following components:

A 5–95% by weight of bivalent structural units derived from acrylamidopropenylmethylenesulfonic acid or its salts, B 1–45% by weight of bivalent structural units derived from open-chain N-vinylamides, C 1–45% by weight of bivalent structural units derived from cyclic N-vinyl-substituted amides, and if desired D 0–50% by weight of a further comonomer selected from the group consisting of acrylamide, acrylic acid and acrylonitrile, the components A to C and, if present, D adding up to 100% by weight.

15 Claims, No Drawings

COPYLYMERS AND THEIR USE AS DRILLING AIDS

FIELD OF THE INVENTION

The present invention relates to novel copolymers and to their use as additives in drilling fluids, for cementation, as completion and workover fluids, and for water shutoff.

DESCRIPTION OF THE RELATED ART

In deep underground wells for recovering oil and natural gas deposits, the use of drilling fluids and cement slurries has been known for some considerable time. The functions of drilling fluids are to carry the drilled rock fragments and the so-called drill dust, to lubricate the bit and the drill pipe, to seal porous rock strata, and to compensate the reservoir pressure by hydrostatic pressure. For the latter purpose, drilling fluids are required to have a high specific weight. This is achieved by adding preferably barite, salts, or clays. Further important features of drilling fluids are temperature stability and appropriate flow properties that are not greatly influenced by changes in electrolyte concentration. The commonest additives for controlling the viscosity and water loss of drilling fluids are polymers such as starch and starch ethers such as carboxymethyl starch, carboxymethylcellulose and carboxymethylhydroxyethylcellulose. However, these additives become ineffective at temperatures above about 120° C. (starch and derivatives) or 140–150° C. (carboxymethylcellulose and carboxymethylhydroxyethylcellulose). Since the 1950s, copolymers of the acrylamide-acrylate type, which are stable even at temperatures of more than 200° C., have been used predominantly in salt-free drilling fluids. The 1970s saw the development of salt-stable copolymers with monomers containing sulfo groups and stable at more than 200° C. (U.S. Pat. Nos. 3,629,101, 4,048,077, 4,309,523).

Cement slurries and completion fluids are used in addition as borehole fluids in the case of deep underground drilling for oil or natural gas. When the borehole has reached a certain depth, iron pipes, known as casing pipes, are introduced into the borehole, the bit for drilling out the next rock strata down being passed through the space inside the pipes. For this purpose, the casing pipes must be secured, i.e., a cement slurry which sets to form a solid stonelike mass must be pumped into the cavity between the rock formation and the outer casing walls, known as the annular space. The hardened cement which forms must be impermeable to gases and liquids in order that no gas and/or oil can flow out of the carrier formation into other formations or as far as the surface. Stringent requirements are placed on the cement slurry to be pumped. It should be readily pumpable, i.e., of extremely low viscosity, and yet should not separate out. The release of water by the cement slurry to the porous rock formation should be low in order to prevent the formation of thick filter cakes at the borehole wall; thick filter cakes would increase the pumping pressure to such an extent, owing to the constriction of the annular space, that the porous rock formation would disintegrate. In addition, if the release of water were excessive, the cement slurry would not set fully and would become permeable to gas and oil. On the other hand, the jacket of cement which forms in the annular space must attain a certain strength as rapidly as possible, and setting must not be accompanied by any shrinkage as this would result in flow channels for gas, oil and water. Establishing the properties of the cement slurry at an optimum is possible only by means of additives.

The most important additives for regulating the setting process are retardants, accelerators, dispersants for liquefaction, and water loss reducers. In some cases, these additives have more than one function. Dispersants such as lignosulfonates and polymethylenenapthalenesulfonates retard setting and also bring about a certain reduction in water loss. Some water loss reducers retard setting and greatly increase viscosity.

Effective water loss reducers used in practice for cement and gypsum slurries include a very wide variety of polymers, copolymers, and combinations thereof.

EP-A-0 483 638 discloses copolymers of acrylamidopropenylmethylenesulfonic acid (AMPS), open-chain and cyclic N-vinylamides, and diolefinically unsaturated ammonium compounds. These monomer combinations produce copolymers which in certain cases are crosslinked and whose thermal stability is inadequate for certain applications.

WO-83/02449 discloses copolymers of acrylic sulfonates such as AMPS, for example, open-chain or cyclic N-vinylamides, amides of acrylic or methacrylic acid, vinylimidazolyl compounds and olefinically unsaturated compounds carrying hydroxyl or alkoxy radicals. The copolymer is crosslinked by using from 5 to 25% by weight of diolefinically unsaturated compounds as further monomers.

DE-A-31 44 770 discloses copolymers of acrylamide or methacrylamide, styrenesulfonates, and N-vinylamides. The latter can be cyclic or open-chain, although the simultaneous use of cyclic and open-chain N-vinylamides is not disclosed.

EP-A-0 141 327 discloses copolymers of (meth)acrylic acid or derivatives thereof, acrylic sulfonates such as, for example, AMPS and N-vinylamides. Here again, the N-vinylamides can be cyclic or open-chain, but not both in the same polymer.

The multiplicity of compounds developed makes it clear that it is always difficult to formulate an optimum cement slurry. In the case of individual parameters predetermined by the type of cementation, the necessary properties must be established at acceptable levels using additives. The large number of compounds developed for reducing water loss indicates just how much of a problem it generally is to establish a required level of water release without substantially increasing the viscosity, to establish the setting time in accordance with the requirement, and to minimize sedimentation. The prior art water-loss-reducing polymers more or less greatly increase the viscosity of the cement slurries, which are usually of high density. In order to be readily pumpable, however, the viscosity of the cement slurries must be kept low. A pumping rate which permits turbulent flow should be possible. Only under such conditions is the drilling fluid completely displaced. This is a prerequisite of effective cementation. In the case of inclined boreholes, the fluid can only be displaced effectively by means of a strong turbulent flow.

High density salt solutions which compensate the reservoir pressure are used for the completion of oil and natural gas wells. The infiltration of such solutions into the reservoir must be kept to a minimum. However, hydroxyethylcelluloses are unsuitable for the prevailing temperatures, which extend to above 200° C., and the high salinities and densities due to $CaCl_2$ and $CaBr_2$.

In the light of the prior art, the object of the present invention was to discover copolymers which are suitable for use in drilling fluids which can in turn be used in an extended temperature range relative to the prior art. The copolymers of the invention should no longer have the thermal instability known from the prior art. A further object was that the copolymers should represent an improvement over the prior art by exhibiting a more uniform flow behavior of the drilling fluid following its preparation and after exposure (aging) within the temperature range in question of from about 130° C. to more than 200° C. The present invention should therefore solve the problem encountered in the prior art of the nonuniform rheological properties of the drilling fluid following its preparation and after exposure (aging), especially in the temperature range from 130° C. to more than 200° C., which problem is manifested in heightened or fluctuating plastic viscosities, yield points and gel strengths.

SUMMARY OF THE INVENTION

It has surprisingly been found that this object is achieved by copolymers which are free from doubly unsaturated ammonium compounds and are composed of structural units derived from AMPS, an open-chain N-vinylamide and a cyclic N-vinylamide. The object is further achieved by copolymers which include certain acrylic derivatives in addition to the said constituents.

The invention therefore provides water-soluble copolymers consisting of the following components:

A 5–95% by weight of bivalent structural units derived from acrylamidopropenylmethylenesulfonic acid or its salts, B 1–45% by weight of bivalent structural units derived from open-chain N-vinylamides, C 1–45% by weight of bivalent structural units derived from cyclic N-vinyl-substituted amides, and if desired D 0–50% by weight of a further comonomer selected from the group consisting of acrylamide, acrylic acid and acrylonitrile, the components A to C and, if present, D adding up to 100% by weight.

DESCRIPTION OF THE PREFERRED EMBODIMENTS

Component A of the copolymers comprises structural units of the formula 1

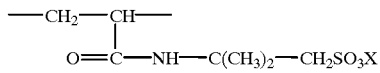

(1)

They are derived from AMPS or its salts. X can be hydrogen or $Li^+$, $Na^+$, $K^+$ or $NH_4^+$.

Where the copolymer contains only components A, B and C, the proportion of component A is preferably from 60 to 90% by weight. Where the copolymer includes a component D as well, the proportion of component A is preferably from 50 to 90% by weight.

Component B of the copolymer generally comprises structural units of the formula 2

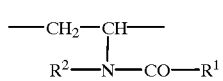

(2)

in which $R^1$ and $R^2$ are H or alkyl radicals. $R^1$ and $R^2$ independently of one another are preferably H or $C_1$–$C_4$ alkyl radicals. In particular, they are independently of one another hydrogen, methyl or ethyl. Particularly preferred structural units of the formula 2 are those where $R^1$ and $R^2$=H, $R^1$=$CH_3$ and $R^2$=H, and $R^1$ and $R^2$=$CH_3$. In a further preferred embodiment, the copolymer contains between 5 and 15% by weight of structural units of the formula 2.

Component C of the copolymer comprises structural units derived from cyclic amides which carry a vinyl radical on the amide nitrogen atom. The cyclic compounds are either aromatic compounds or saturated compounds. In one preferred embodiment of the invention component C comprises structural units of the formula 3

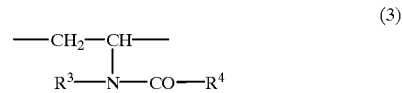

(3)

in which $R^3$ and $R^4$ with the inclusion of the —N—CO— group form a ring having 5, 6, 7 or 8 ring atoms. Rings having 5, 6 or 7 ring atoms are preferred. $R^3$ and $R^4$ can include heteroatoms, but preferably include only carbon atoms.

In one particularly preferred embodiment, formula 3 represents a structural unit of the formula 3a

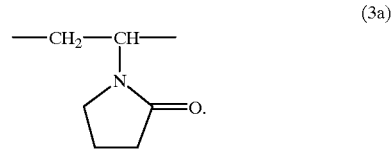

(3a)

In a further particularly preferred embodiment, formula 3 represents N-vinylcaprolactam.

If component C is derived from an aromatic nitrogen compound, then in one particularly preferred embodiment it comprises a structural unit of the formula 3b

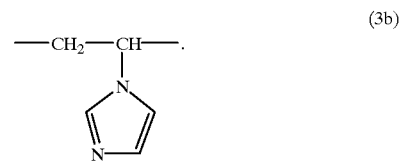

(3b)

In a further preferred embodiment of the invention, the copolymer contains from 5 to 10% by weight of structural units of the formula 3.

In one preferred embodiment the copolymer further comprises a component D. This component D comprises structural units of the formula 4

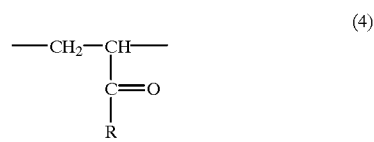

(4)

in which R is —CN, COOX (X=H or monovalent cation) or —$CONR^5_2$. $R^5$ is hydrogen or $C_1$–$C_4$ alkyl, preferably hydrogen. Where the copolymer includes a component D, its proportion is preferably below 20% by weight, with particular preference 5–10% by weight.

Preferred copolymers have molecular weights of from 50,000 to 5,000,000, in particular from 200,000 to 3,000,000, especially from 500,000 to 1,500,000 units.

The copolymers of the invention are free from diolefinically unsaturated ammonium compounds. The copolymers of the invention are preferably also free from other di- or polyolefinically unsaturated compounds that are able to induce crosslinking as a result of further polymerizations.

The copolymers of the invention can be prepared by the techniques of solution polymerization, bulk polymerization, emulsion polymerization, inverse emulsion polymerization, precipitation polymerization or gel polymerization.

The polymerization is preferably conducted as a solution polymerization in water or as a precipitation polymerization.

When the copolymerization is conducted in a water-miscible organic solvent, the general procedure is to operate under the conditions of precipitation polymerization. In this case the polymer is obtained directly in solid form and can be isolated by distillative removal of the solvent or by filtration with suction followed by drying. Particularly suitable water-miscible organic solvents for conducting the preparation process of the invention are water-soluble alkanols, namely those having 1 to 4 carbon atoms such as methanol, ethanol, propanol, isopropanol, n-, sec- and isobutanol, but preferably tert-butanol.

The water content of the lower alkanols used as solvents in this case should not exceed 6% by weight, since otherwise lumps may be formed during the polymerization. It is preferred to operate with a water content of from 0 to 3% by weight. The amount of solvent to be used depends to a certain extent on the nature of the comonomers that are employed. In general, from 200 to 1000 g of the solvent are used per 100 g of total monomers. When the polymerization is conducted in inverse emulsion, the aqueous monomer solution is emulsified in a known manner in a water-immiscible organic solvent such as cyclohexane, toluene, xylene, heptane or high-boiling petroleum fractions with the addition of from 0.5 to 8% by weight, preferably from 1 to 4% by weight, of known emulsifiers of the W/O type and is polymerized using customary free-radical initiators.

The principle of inverse emulsion polymerization is known from U.S. Pat. No. 3,284,393. With this technique, water-soluble monomers or mixtures thereof are polymerized with heating to form copolymers of high molecular mass by first emulsifying the monomers or aqueous solutions thereof in a water-immiscible organic solvent which forms the continuous phase, with the addition of water-in-oil emulsifiers, and heating this emulsion in the presence of free-radical initiators. The comonomers to be used can be emulsified as such in the water-immiscible organic solvent, or can be used in the form of an aqueous solution containing between 100 and 5% by weight of comonomers and from 0 to 95% by weight of water, the composition of the aqueous solution being a question of the solubility of the comonomers in water and of the intended polymerization temperature. The ratio between water and monomer phase can be varied within wide limits and is generally from 70:30 to 30:70.

In order to emulsify the monomers in the water-immiscible organic solvent to form a water-in-oil emulsion, from 0.1 to 10% by weight, based on the oil phase, of a water-in-oil emulsifier is added to the mixtures. It is preferred to use emulsifiers having a relatively low HLB. The HLB is a measure of the hydrophobicity and hydrophilicity of surfactants and emulsifiers (Griffin, J. Soc. Cosmetic Chemists 1, (1950), 311). Substances having a low HLB, below about 10, are generally good water-in-oil emulsifiers.

The oil phase used can in principle be any inert water-insoluble liquid, i.e., any hydrophobic organic solvent. For the purposes of the present invention use is generally made of hydrocarbons whose boiling point lies within the range from 120 to 350° C. These hydrocarbons can be saturated, linear or branched paraffinic hydrocarbons, as predominate in petroleum fractions, which may also include the customary fractions of naphthenic hydrocarbons. However, it is also possible to use aromatic hydrocarbons such as, for example, toluene or xylene, and the mixtures of the abovementioned hydrocarbons, as the oil phase. Preference is given to the use of a mixture of saturated normal and isoparaffinic hydrocarbons containing up to 20% by weight of naphthenes. A detailed description of the technique can be found, for example, in DE-A-1 089 173 and in U.S. Pat. Nos. 3,284, 393 and 3,624,019.

Copolymers having molecular weights of more than 1,000,000 are obtained if the polymerization is conducted in aqueous solution by the technique known as gel polymerization. In this case, 15–60% strength by weight solutions of the comonomers are polymerized with known suitable catalysts, without mechanical mixing, utilizing the Trommsdorff-Norrish effect (Bios Final Rep. 363, 22; Macromol. Chem. 1, 169/1947).

Following mechanical comminution using appropriate apparatus, the copolymers of the invention prepared by this route, which are in the form of aqueous gels, can be dissolved directly in water and so used. Alternatively, they can be obtained in solid form after the water has been removed by means of known drying processes, and can be redissolved in water at the time of use.

The polymerization reactions are conducted in the temperature range between –60 and 200° C., preferably between 10 and 120° C., under either atmospheric or superatmospheric pressure. The polymerization is generally performed under an inert gas atmosphere, preferably under nitrogen.

The polymerization can be initiated using high-energy electromagnetic or corpuscular beams or the customary chemical polymerization initiators, examples being organic peroxides such as benzoyl peroxide, tert-butyl hydroperoxide, methyl ethyl ketone peroxide, cumene hydroperoxide, azo compounds such as azodiisobutyronitrile or 2'-azobis-(2-amidinopropane)dihydrochloride, and inorganic peroxo compounds such as $(NH_4)_2S_2O_8$ or $K_2S_2O_8$ or $H_2O_2$ alone or in combination with reducing agents such as sodium hydrogen sulfite and iron(II) sulfate or redox systems containing as reducing component an aliphatic or aromatic sulfinic acid such as benzenesulfinic acid and toluenesulfinic acid or derivatives of these acids, such as, for example, Mannich adducts of sulfinic acid, aldehydes and amino compounds, as are described in DE-C-13 01 566. From 0.03 to 2 g of the polymerization initiator are generally used per 100 g of total monomers.

Small amounts of what are known as moderators may be added to the polymerization mixtures: these moderators harmonize the progress of the reaction by flattening the reaction rate/time plot. They therefore lead to an improvement in the reproducibility of the reaction and so enable the preparation of uniform products having a narrow molar mass distribution and high chain length. Examples of suitable moderators of this type are nitrilotrispropionylamide or monoalkylamines, dialkylamines or trialkylamines, such as dibutylamine, for example. Such moderators may also be used with advantage in the preparation of the copolymers of the invention. Furthermore, regulators can be added to the polymerization mixtures, these regulators adjusting the molecular weight of the resultant polymers by means of targeted chain termination. Known regulators which can be used are, for example, alcohols such as methanol, ethanol, propanol, isopropanol, n-butanol and amyl alcohols, alkyl mercaptans such as dodecyl mercaptan and tert-dodecyl mercaptan, isooctyl thioglycolate and certain halogen compounds such as, for example, carbon tetrachloride, chloroform and methylene chloride. The copolymers of the invention are outstandingly suitable as aids for drilling fluids. They display a very good protective colloid effect both at high temperatures and at high electrolyte concentrations, and in terms of electrolyte stability and aging stability correspond to the prior art. In terms of the action in reducing pressurized water and of the rheological behavior following preparation and aging over the entire temperature range from 130 to more than 200° C., they are considerably superior to the copolymers known to date from U.S. Pat. Nos. 3,629,101, 4,048,077 and 4,309,523.

To formulate aqueous drilling fluids the copolymers of the invention are used in concentrations of from 0.5 to 40 kg/m$^3$, preferably from 3 to 30 kg/m$^3$. In order to increase viscosity and seal off formations through which drilling has taken place, the aqueous drilling fluids contain predominantly bentonites. Barite, chalk and iron oxides are used to raise the density of the drilling muds.

Bentonite, barite, chalk and iron oxide can be added alone or in any of a wide variety of mixing proportions to the drilling fluids. The limiting factor on the upward side are the rheological properties of the drilling muds.

The preparation and use of the polymers of the invention are illustrated with the following examples.

polymer is obtained in the form of a lightweight white powder which dissolves readily in water. The Fikentscher K value is 170.

The copolymers of Table 1 can be prepared by the same procedure.

In Tables 1 and 2, the meanings of the abbreviations are as follows:
AM: Acrylamide
VIMA: N-Vinyl-N-methyl-acetamide
AMPS: 2-Acrylamido-2-methylpropane-3-sulfonic acid, where the superscripts denote 1 the $NH_4$ salt
2 the dimethyl-β-hydroxyethylammonium salt
3 the K salt
4 the Na salt.

VF: Vinylformamide
NVP: N-Vinylpyrrolidone
NVI: N-Vinylimidazole
In the column headed "catalyst" the definitions are as follows:
A: Ammonium peroxodisulfate
B: Ammoniumperoxodisulfate+dibutylammonium chloride
C: Azoisobutyronitrile
inv. Example in accordance with the invention
comp. Comparative example

TABLE 1

| No. | K value | Monomer composition | | | | | | Reaction | | |
| | | AMPS | VF | VIMA | NVP | NVI | AM | Catalyst | medium | Note |
| --- | --- | --- | --- | --- | --- | --- | --- | --- | --- | --- |
| 2  | 160 | 85$^1$   | 7.5 |    | 7.5 |   |     | C | tert-But | inv. |
| 3  | 155 | 82.5$^1$ | 5   |    | 5   |   | 7.5 | C | tert-But | inv. |
| 4  | 162 | 90$^1$   | 5   |    | 5   |   |     | C | tert-But | inv. |
| 5  | 158 | 85$^1$   | 5   |    | 5   |   | 5   | C | tert-But | inv. |
| 6  | 170 | 85$^1$   | 5   |    |     | 5 | 5   | C | tert-But | inv. |
| 7  | 175 | 80$^1$   | 10  |    | 10  |   |     | C | tert-But | inv. |
| 8  | 162 | 75$^1$   | 10  |    | 10  |   | 5   | C | tert-But | inv. |
| 9  | 159 | 72.5$^1$ | 10  |    | 10  |   | 7.5 | C | tert-But | inv. |
| 10 | 165 | 70$^1$   | 10  |    | 10  |   | 10  | C | tert-But | inv. |
| 11 | 154 | 80$^1$   | 5   |    | 5   |   | 10  | C | tert-But | inv. |
| 12 | 170 | 65$^1$   |     | 20 |     |   | 15  | C | tert-But | comp. |
| 13 | 160 | 77.5     |     |    | 15  |   | 7.5 | C | tert-But | comp. |
| 14 | 162 | 77.5     | 15  |    |     |   | 7.5 | C | tert-But | comp. |
| 15 | 165 | 80$^1$   |     | 20 |     |   |     | C | tert-But | comp. |
| 16 | 161 | 85       | 15  |    |     |   |     | C | tert-But | comp. |
| 17 | 163 | 85       |     |    | 15  |   |     | C | tert-But | comp. |

EXAMPLE 1

A polymerization flask with a capacity of 2 l, equipped with stirrer, reflux condenser, dropping funnel, gas inlet tube and electrically heated water bath, is charged with 600 ml of tert-butanol, and 77.5 g of AMPS are suspended in this initial charge with stirring. Then 8.5 l of NH$_3$ gas are passed in, followed by the addition of 7.5 g of acrylamide, 7.5 g of N-vinyl-N-formamide and 7.5 g of N-vinylpyrrolidone. Nitrogen is passed in while the reaction mixture is heated to 50° C. using the electric water bath and 1.0 g of azoisobutyronitrile is added. Polymerization begins after an induction time of about 2 hours, the reaction temperature rises to 70° C. and the polymer is precipitated. Heating is continued at 80° C. for 2 hours more, during which a viscous suspension is formed. The polymer can be isolated by filtration with suction followed by drying under reduced pressure at 50° C. Alternatively, the solvent can be removed from the reaction mixture directly by distillation under reduced pressure. The

EXAMPLE 18

The apparatus described in Example 1 is charged with 200 ml of deionized water, 35 ml of 25% strength aqueous ammonia solution are added, then 77.5 g of AMPS are introduced with stirring, while passing in a gentle stream of N$_2$; after a clear solution has formed, 7.5 g of acrylamide, 7.5 g of N-vinylformamide and 7.5 g of vinylpyrrolidone are added. The pH of the solution is 8.0. At 23° C. the polymerization is initiated by adding 10 ml of a 0.5% strength aqueous ammonium peroxodisulfate solution. Following an induction period of about 40 minutes the polymerization begins, the temperature rises to 42° C. and the reaction mixture becomes viscous. Heating is continued for 2 hours at 80° C.

This gives a clear solution of high viscosity which has a Fikentscher K value of 210 and can be supplied directly for use as a drilling fluid additive or additive to cement slurries.

The copolymers assembled in Table 2 below can be synthesized analogously.

TABLE 2

| No. | K value | Monomer composition | | | | |
|---|---|---|---|---|---|---|
| | | AMPS | VF | NVP | NVI | AM |
| 19 | 190 | 85[1] | 7.5 | 7.5 | | |
| 20 | 155 | 82.5[2] | 5 | 5 | | 7.5 |
| 21 | 210 | 90[3] | 5 | 5 | | |
| 22 | 198 | 85 | 5 | 5 | | 5 |
| 23 | 205 | 85[4] | 5 | | 5 | 5 |
| 24 comp. | 154 | 75 | 7.5 | 7.5 | | 10** |

Note**): contains DADMAC = diallyldimethylammonium chloride instead of AM = acrylamide In the examples below, copolymers of the invention are compared with known copolymers in a saltwater drilling fluid which is weighted with barite, contains 3% KCl and has a specific weight of 2.1 kg/l. The amount used was 2.5% by weight in each case.

The quality of the fluid and hence the effectiveness of the additives is evaluated in accordance with the following criteria:

a) Fluid loss after 30 minutes in an HTHP filterpress at 150° C. under a pressure of 500 psi (~35 bar) after 16 h and 66 h of dynamic aging of the fluid in a roller oven at 130° C., 150° C., 170° C., 185° C. and 200° C.

b) Rheology (apparent viscosity [App. Visc.], yield point [YP], gel strengths after 10 seconds [10"] and 10 minutes [10']) measured in a Fann 35 rotational viscometer after preparation by mixing and after 16 h and 66 h of dynamic aging in the roller oven at 130, 150, 170, 185 and 200° C.

The following additives were used for the investigation:

A) Copolymer (of the invention) consisting of 77.5% by weight AMPS, 7.5% N-vinylformamide, 7.5% N-vinylpyrrolidone and 7.5% acrylamide, as in Example 1

B) Copolymer (of the invention) consisting of 85% AMPS, 7.5% N-vinylformamide, 7.5% N-vinylpyrrolidone, as in Example 2

C) Copolymer consisting of 87.5% AMPS, 15% N-vinylformamide and 7.5% acrylamide (Comparative Example 14)

D) Copolymer consisting of 87.5% AMPS, 15% N-vinylpyrrolidone and 7.5% acrylamide (Comparative Example 13)

E) Copolymer consisting of 85% AMPS and 15% NVP (Comparative Example 17)

F) Copolymer consisting of 65% AMPS, 20% N-vinyl-N-methylacetamide and 15% acrylamide (Comparative Example 12)

F) Copolymer consisting of 65% AMPS, 20% N-vinyl-N-methylacetamide and 15% acrylamide (Comparative Example 12)

G) Copolymer consisting of 80% AMPS and 20% N-vinylmethylacetamide (Comparative Example 15)

H) Copolymer consisting of 75% AMPS, 7.5% N-vinylformamide, 7.5% N-vinylpyrrolidone and 10% DADMAC (Comparative Example 24)

TABLE 3

| Copolymer | Aging/h | initial | 16 | 16 | 16 | 66 | 16 |
|---|---|---|---|---|---|---|---|
| | Temp. (° C.) | | 130 | 150 | 170 | 170 | 200 |
| A | Fluid loss (ml) | | 44 | 46 | 22 | 19 | 27 |
| | App. Visc. (cP) | 76 | 85 | 74 | 83 | 74 | 56 |
| | YP (lb/100 ft^2) | 27 | 31 | 34 | 22 | 8 | 6 |
| | 10" gel st. | 5 | 8 | 9 | 7 | 3.5 | 5 |
| | 10' gel st. | 12 | 14 | 12 | 10 | 6 | 5 |
| B | Fluid loss (ml) | | 27 | 28 | 26 | 16 | 24 |
| | App. Visc. (cP) | 53 | 61 | 64 | 74 | 72 | 61 |
| | YP (lb/100 ft^2) | 14 | 15 | 20 | 22 | 24 | 17 |
| | 10" gel st. | 6 | 5 | 6 | 7 | 7 | 6 |
| | 10' gel st. | 12 | 9 | 10 | 11 | 11 | 9 |
| C | Fluid loss (ml) | | 46 | 42 | 22 | 28 | 35 |
| | App. Visc. (cP) | 118 | 120 | 115 | 100 | 91 | 63 |
| | YP (lb/100 ft^2) | 60 | 53 | 100 | 38 | 15 | 24 |
| | 10" gel st. | 14 | 18 | 71 | 9 | 2.5 | 2 |
| | 10' gel st. | 28 | 26 | 85 | 20 | 6 | 5 |
| D | Fluid loss (ml) | | 42 | 25 | 22 | 20 | 36 |
| | App. Visc. (cP) | 69 | 78 | 107 | 92 | 67 | 46 |
| | YP (lb/100 ft^2) | 22 | 34 | 58 | 37 | 10 | 5 |
| | 10" gel st. | 7 | 8 | 56 | 7 | 5 | 5 |
| | 10' gel st. | 12 | 14 | 65 | 16 | 6 | 6 |
| E | Fluid loss (ml) | | 28 | 26 | 26 | 24 | 28 |
| | App. Visc. (cP) | 101 | 81 | 108 | 93 | 115 | 75 |
| | YP (lb/100 ft^2) | 50 | 26 | 42 | 30 | 30 | 14 |
| | 10" gel st. | 20 | 8 | 10 | 9 | 11 | 6 |
| | 10' gel st. | 40 | 12 | 20 | 13 | 17 | 12 |
| | | | | | | 16 h/185° C. | |
| F | Fluid loss (ml) | | 37 | 20 | 16 | 37 | >150 |
| | App. Visc. (cP) | 134 | 106 | 108 | 76 | 45 | 35 |
| | YP (lb/100 ft^2) | 66 | 46 | 31 | 11 | 11 | 12 |
| | 10" gel st. | 35 | 19 | 6 | 4 | 5 | 20 |
| | 10' gel st. | 82 | 29 | 14 | 5 | 14 | 36 |
| | | | | | | 16 h/185° C. | |
| G | Fluid loss (ml) | | 86 | 88 | 60 | 38 | 19.5 |
| | App. Visc. (cP) | 83 | 74 | 80 | 105 | 76 | 64 |
| | YP | 46 | 26 | 50 | 80 | 21 | 6 |

TABLE 3-continued

| Copolymer | Aging/h | initial | 16 | 16 | 16 | 66 | 16 |
|---|---|---|---|---|---|---|---|
| | 10" gel st. | 40 | 8 | 56 | 78 | 6 | 3 |
| | 10' gel st. | 74 | 8 | 81 | 80 | 9 | 5 |
| | | | | | | 16 h/185° C. | |
| H | Fluid loss (ml) | | 42 | 51 | 80 | >150 | >150 |
| | App. Visc. (cP) | 74 | 83 | 73 | 60 | 48 | 33 |
| | YP (lb/100 ft^2) | 25 | 29 | 32 | 24 | 10 | 11 |
| | 10" gel st. | 6 | 9 | 10 | 12 | 18 | 23 |
| | 10' gel st. | 13 | 15 | 17 | 20 | 35 | 40 |

The test results indicate the superiority of the polymers A and B of the invention over the Comparative Examples C, D and E and over the known polymers F and G, which represent the prior art, in terms of the uniform rheological properties of the drilling fluid after preparation by mixing and after aging over the temperature range of 130–200° C. Relative to F and G, the polymers A and B of the invention likewise have a considerably extended temperature range in terms of their action as fluid loss additive. Relative to Comparative Example H, which additionally includes DAD-MAC as comonomer, the polymers A and B of the invention have a much greater thermal stability, as shown by the values for the HTHP press water loss and the gel strengths, which rise sharply above 150° C. in the case of Comparative Example H.

When copolymers of the invention are added to conventional deep-well cement slurries, the resulting products have considerably improved flow and setting properties and exhibit reduced water loss.

In this case, the polymers of the invention prepared, for example, either in accordance with Example 1 or in accordance with Example 18, are added in amounts of 0.1–2.0% by weight, based on the cement used, to cement slurries of standard composition, which based, for example, on "Class G" deep-well cement contain, for example, 44% by weight of water, 0.1–2.0% by weight of a commercially customary dispersant for deep-well cement, and also, if desired, retardants or accelerators and other additives. Preferably, the copolymers of the present invention are added to deep-well cement slurries in an amount ranging from 0.1 to 1.0 weight percent based on the weight of cement. Depending on requirements, the cement slurry can be prepared by mixing not with water but alternatively, for example, with synthetic salt water or with NaCl solutions of different densities up to the saturation point.

The quality of the cement slurries prepared in this way with the polymers of the invention is assessed in accordance with API Spec. 10. With the polymers of Examples 7 and 22, for example, the results in cement slurries having an advantageously low plastic viscosity, low water loss and a setting time which can be regulated as per requirements within a temperature range of 60–200° C.

For completion and workover fluids use is made, for example, of $CaCl_2$ (max. 1.40 g/cm$^3$), $CaBr_2$ (max. 1.71 g/cm$^3$) or $CaCl_2/CaBr_2$ (max. 1.81 g/cm$^3$) solutions, which are required to exhibit low water loss even at relatively high temperatures. In a salt solution with a density of 1.80 g/cm$^3$ based on 19.2% by weight $CaBr_2$ and 15.2% by weight $CaCl_2$ under testing in accordance with API Code 29 at an application rate of 50 g/l, the polymer according to Example 21, for example, gives a water loss of 25 cm$^3$ at 20° C. and water losses of 9.5 and 10.5 cm$^3$ respectively after aging at 100° C. for 17 h and aging at 150° C. for 15 h.

What is claimed is:

1. A water-soluble copolymer consisting of the following components:

A 5–95% by weight of bivalent structural units derived from acrylamidopropenylmethylenesulfonic acid or its salts, B 1–45% by weight of bivalent structural units derived from open-chain N-vinylamides, C 1–45% by weight of bivalent structural units derived from cyclic N-vinyl-substituted amides, and if desired D 0–50% by weight of a further comonomer selected from the group consisting of acrylamide, acrylic acid and acrylonitrile, the components A to C and, if present, D adding up to 100% by weight.

2. A copolymer as claimed in claim 1, containing from 60 to 90% by weight of component A, from 5 to 20% by weight of components B, and from 5 to 20% by weight of components C.

3. A copolymer as claimed in claim 1, containing from 50 to 90% by weight of components A, from 5 to 20% by weight of component B, from 5 to 20% by weight of component C, and from 5 to 20% by weight of component D.

4. A copolymer as claimed in claim 1, wherein component B comprises a compound of the formula 2

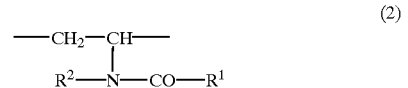

where $R^1$ and $R^2$=H, $R^1$ and $R^2$=$CH_3$, or $R^1$=$CH_3$ and $R^2$=H.

5. A copolymer as claimed in claim 1, wherein component C comprises a compound of the formula 3

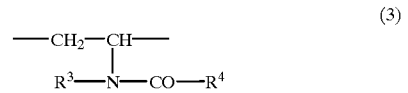

in which $R^3$ and $R^4$ with the inclusion of the —N—CO— group form a ring of 5, 6 or 7 atoms, $R^3$ and $R^4$ including only carbon atoms.

6. A copolymer as claimed in claim 5, wherein component C is a structural unit of the formula 3a

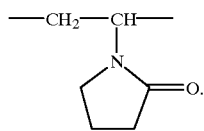

(3a)

7. A method for reducing water loss in an aqueous drilling fluid comprising adding to the aqueous drilling fluid from 0.5 to 40 kg/m$^3$ of the water soluble copolymer of claim 1.

8. A method for reducing water loss in deep-well cement slurries comprising water and cement, said method comprising adding from 0.1–1% by weight of the water soluble copolymer of claim 1, based on the cement in said deep-well cement slurries.

9. A process for producing a water-soluble copolymer comprising:
   a) admixing a monomer mixture consisting of:
      i) 5–95% by weight of bivalent structural units derived from acrylamidopropenylmethylenesulfonic acid or its salts,
      ii) 1–45% by weight of bivalent structural units derived from open-chain N-vinylamides,
      iii) 1–45% by weight of bivalent structural units derived from cyclic N-vinyl-substituted amides, and if desired
      iv) 0–50% by weight of a further comonomer selected from the group consisting of acrylamide, acrylic acid and acrylonitrile, wherein the components (i) to (iii) and, if present, (iv) adding up to 100% by weight;
   b) polymerizing the monomer mixture in a water-miscible organic solvent to provide the water-soluble copolymer.

10. The process of claim 9 wherein the water-miscible organic solvent is selected from the group consisting of methanol, ethanol, propanol, isopropanol, n-isobutanol, sec-isobutanol, tert-butanol, and mixtures thereof.

11. The process of claim 9 wherein the water-miscible organic solvent comprises tert-butanol.

12. The process of claim 9 wherein the water-miscible organic solvent comprises less than 6 weight percent water.

13. The process of claim 9 wherein the water-miscible organic solvent comprises less than 3 weight percent water.

14. The process of claim 9 wherein a ratio of the water-miscible organic solvent to the monomer mixture ranges from 2:1 to 10:1 on a weight basis.

15. The process of claim 9 further comprising isolating the water-soluble copolymer by distillation or filtration.

\* \* \* \* \*